(12) United States Patent
Veiga

(10) Patent No.: US 10,808,621 B2
(45) Date of Patent: *Oct. 20, 2020

(54) GAS TURBINE ENGINE HAVING SUPPORT STRUCTURE WITH SWEPT LEADING EDGE

(71) Applicant: RAYTHEON TECHNOLOGIES CORPORATION, Farmington, CT (US)

(72) Inventor: Brent Veiga, Higganum, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/784,463

(22) Filed: Oct. 16, 2017

(65) Prior Publication Data

US 2018/0051631 A1 Feb. 22, 2018

Related U.S. Application Data

(63) Continuation of application No. 14/430,798, filed as application No. PCT/US2013/025831 on Feb. 13, 2013, now Pat. No. 9,790,861.

(Continued)

(51) Int. Cl.
*F02C 7/20* (2006.01)
*F01D 25/28* (2006.01)
(Continued)

(52) U.S. Cl.
CPC ............... *F02C 7/20* (2013.01); *F01D 5/143* (2013.01); *F01D 5/145* (2013.01); *F01D 9/041* (2013.01); *F01D 25/24* (2013.01); *F01D 25/28* (2013.01); *F05D 2240/121* (2013.01); *Y02T 50/60* (2013.01)

(58) Field of Classification Search
CPC ........ F01D 5/142; F01D 5/145; F01D 17/162; F01D 25/28; F02C 7/20
See application file for complete search history.

(56) References Cited

U.S. PATENT DOCUMENTS 3,536,414 A * 10/1970 Smith, Jr. ................. F02K 3/06
415/208.5
3,792,586 A 2/1974 Kasmarik
(Continued)

FOREIGN PATENT DOCUMENTS

EP 2098757 9/2009

OTHER PUBLICATIONS

International Search Report for International Patent Application No. PCT/US2013/025831 completed Nov. 13, 2013.
(Continued)

*Primary Examiner* — Arun Goyal
(74) *Attorney, Agent, or Firm* — Carlson, Gaskey & Olds, P.C.

(57) ABSTRACT

A gas turbine engine nacelle assembly according to an exemplary aspect of the present disclosure includes, among other things, a core casing defined about an axis; a fan nacelle mounted at least partially around the core nacelle; and a support structure extending radially from the core nacelle to the fan nacelle, wherein the support structure has a leading edge that is swept.

12 Claims, 2 Drawing Sheets

Related U.S. Application Data

(60) Provisional application No. 61/706,853, filed on Sep. 28, 2012.

(51) Int. Cl.
  *F01D 5/14* (2006.01)
  *F01D 9/04* (2006.01)
  *F01D 25/24* (2006.01)

(56) References Cited

U.S. PATENT DOCUMENTS

| | | |
|---|---|---|
| 5,251,435 A | 10/1993 | Pauley |
| 5,433,674 A | 7/1995 | Sheridan |
| 5,452,575 A * | 9/1995 | Freid ............... B64D 27/18 244/54 |
| 6,139,259 A * | 10/2000 | Ho ............... F04D 29/684 415/119 |
| 6,334,753 B1 * | 1/2002 | Tillman ............... B64C 21/04 415/1 |
| 6,619,030 B1 | 9/2003 | Seda |
| 6,943,699 B2 | 9/2005 | Ziarno |
| 7,101,145 B2 | 9/2006 | Tsuchiya |
| 7,845,158 B2 | 12/2010 | Udall |
| 8,137,060 B2 | 3/2012 | Winter et al. |
| 8,176,803 B1 | 5/2012 | Willett et al. |
| 8,221,071 B2 * | 7/2012 | Wojno ............... F01D 9/041 415/208.1 |
| 8,333,559 B2 * | 12/2012 | Bushnell ............... F04D 29/544 415/211.2 |
| 8,911,203 B2 | 12/2014 | Reinhardt |
| 2008/0092548 A1 | 4/2008 | Morford et al. |
| 2009/0097967 A1 | 4/2009 | Smith |
| 2009/0123274 A1 | 5/2009 | Chaudhry |
| 2009/0178416 A1 | 7/2009 | Migliaro |
| 2009/0226303 A1 | 9/2009 | Grabowski |
| 2009/0252600 A1 | 10/2009 | Winter et al. |
| 2009/0288387 A1 | 11/2009 | Baltas |
| 2010/0057957 A1 | 3/2010 | Smilg et al. |
| 2010/0080697 A1 | 4/2010 | Wojno |
| 2011/0202251 A1 | 8/2011 | Luppold |
| 2013/0084174 A1 * | 4/2013 | Maalouf ............... F01D 25/246 415/208.1 |

OTHER PUBLICATIONS

International Search Report for International Application No. PCT/US2013/025061 completed Nov. 8, 2013.
International Preliminary Report on Patentability for International Application No. PCT/US20131025061 dated Apr. 9, 2015.

* cited by examiner

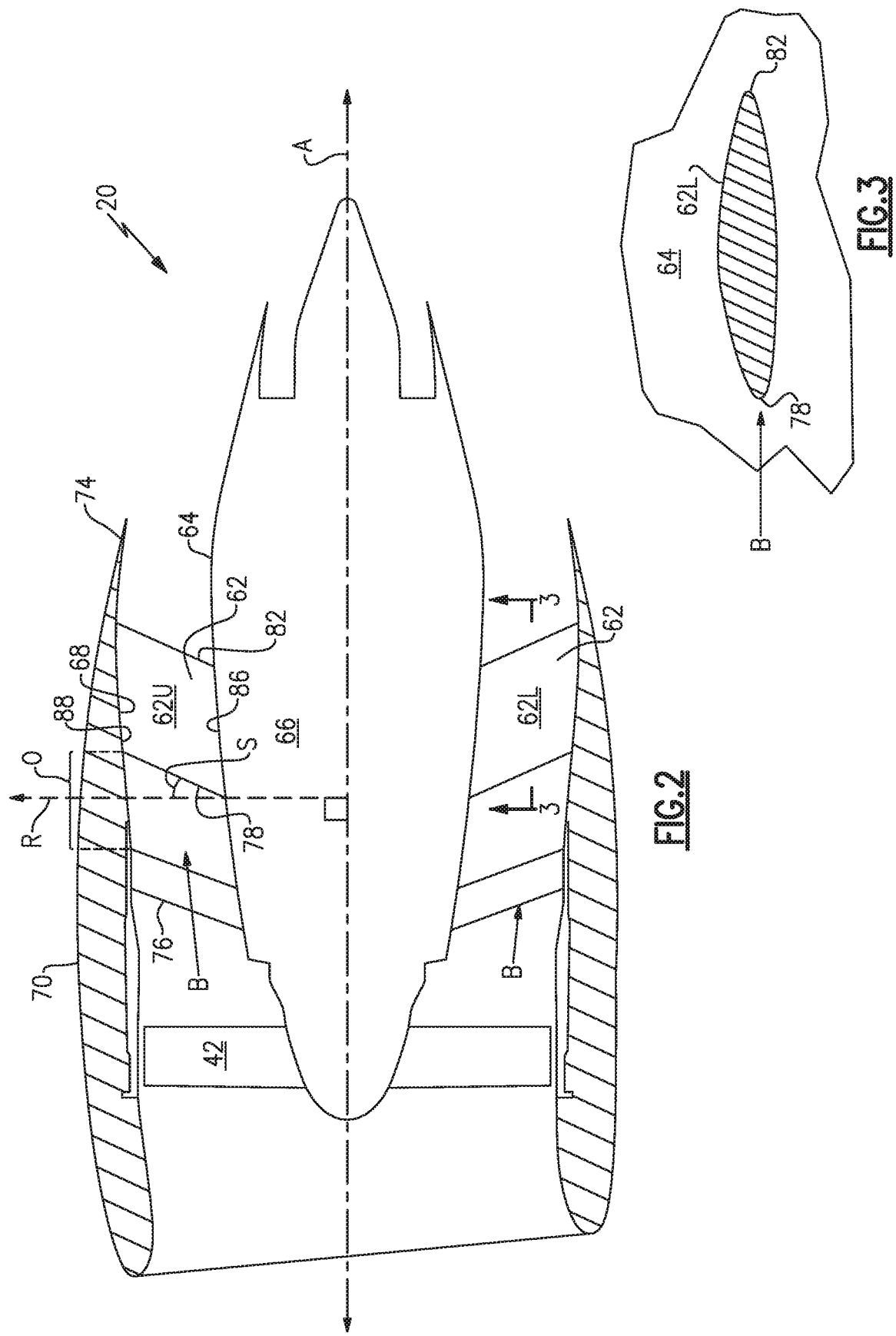

GAS TURBINE ENGINE HAVING SUPPORT STRUCTURE WITH SWEPT LEADING EDGE

CROSS-REFERENCE TO RELATED APPLICATIONS

This application is a continuation of Ser. No. 14/430798, filed 24 Mar. 2015, which is a national stage entry of PCT/US2013/025831, filed 13 Feb. 2013, which claims priority to U.S. Provisional Application No. 61/706853, which was filed on 28 Sep. 2012 and incorporated herein by reference.

BACKGROUND

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Although geared architectures have improved propulsive efficiency, turbine engine manufacturers continue to seek further improvements to engine performance including improvements to thermal, transfer, and propulsive efficiencies.

SUMMARY

A gas turbine engine nacelle assembly according to an exemplary aspect of the present disclosure includes, among other things, a core casing defined about an axis; a fan nacelle mounted at least partially around the core nacelle; and a support structure extending radially from the core nacelle to the fan nacelle, wherein the support structure has a leading edge that is swept.

In a further non-limiting embodiment of the foregoing nacelle assembly, the support structure comprises an upper bifurcation and a lower bifurcation.

In a further non-limiting embodiment of the either of the foregoing nacelle assemblies, the leading edge has an angle relative to a radial axis of the gas turbine engine, the angle greater than 1 degree.

In a further non-limiting embodiment of the any of the foregoing nacelle assemblies, an interface between the core casing and the support structure is further upstream than an interface between the fan nacelle and the support structure relative to a direction of flow.

In a further non-limiting embodiment of the any of the foregoing nacelle assemblies, the leading edge has an angle relative to a radial axis of the gas turbine engine, the angle from 1 degree to 45 degrees.

In a further non-limiting embodiment of the any of the foregoing nacelle assemblies, the leading edge has an angle relative to a radial axis of the gas turbine engine, the angle is from 10 degrees to 20 degrees.

In a further non-limiting embodiment of the any of the foregoing nacelle assemblies, the support structure has an eagle beak cross-section.

In a further non-limiting embodiment of the any of the foregoing nacelle assemblies, the leading edge extends radially from the core nacelle to the fan nacelle.

In a further non-limiting embodiment of the any of the foregoing nacelle assemblies, the gas turbine engine is a geared gas turbine engine.

A gas turbine engine according to another exemplary aspect of the present disclosure includes, among other things, a fan, a compressor section, a combustor section, and a turbine section, the turbine section configured to drive a shaft to rotatably drive the fan and the compressor; a geared architecture rotatably coupling the shaft and the fan; and a nacelle having an inner wall providing a bypass duct configured to receive bypass air from the fan, a support structure extending radially from a core of a gas turbine engine to the inner wall, the support structure having at least one leading-edge that is swept.

In a further non-limiting embodiment of the foregoing gas turbine engine, the at least one leading edge extends radially from the core to the inner wall.

In a further non-limiting embodiment of either of the foregoing gas turbine engines, the leading edge has an angle relative to a radial axis of the gas turbine engine, the angle greater than 1 degree.

In a further non-limiting embodiment of any of the foregoing gas turbine engines, the leading edge has an angle relative to a radial axis of the gas turbine engine, the angle from 1 degree to 45 degrees.

In a further non-limiting embodiment of any of the foregoing gas turbine engines, the leading edge has an angle relative to a radial axis of the gas turbine engine, the angle is from 10 degrees to 20 degrees.

A method of influencing flow within a gas turbine engine according to yet another exemplary aspect of the present disclosure includes, among other things, providing a support structure within a bypass flowpath, the support structure having a swept leading edge.

In a further non-limiting embodiment of the foregoing method of influencing flow, the swept leading edge has an angle relative to a radial axis of the gas turbine engine that is greater than 1 degree.

In a further non-limiting embodiment of either of foregoing methods of influencing flow, the support structure comprises an upper bifurcation and a lower bifurcation.

Although the different examples have the specific components shown in the illustrations, embodiments of this disclosure are not limited to those particular combinations. It is possible to use some of the components or features from one of the examples in combination with features or components from another one of the examples.

DESCRIPTION OF THE FIGURES

The various features and advantages of the disclosed examples will become apparent to those skilled in the art from the detailed description. The figures that accompany the detailed description can be briefly described as follows:

FIG. 2 shows a schematic section view of a portion of an example embodiment of the gas turbine engine of FIG. 1.

FIG. 3 shows a section view at line 3-3 in FIG. 2.

DETAILED DESCRIPTION

Figure 1:
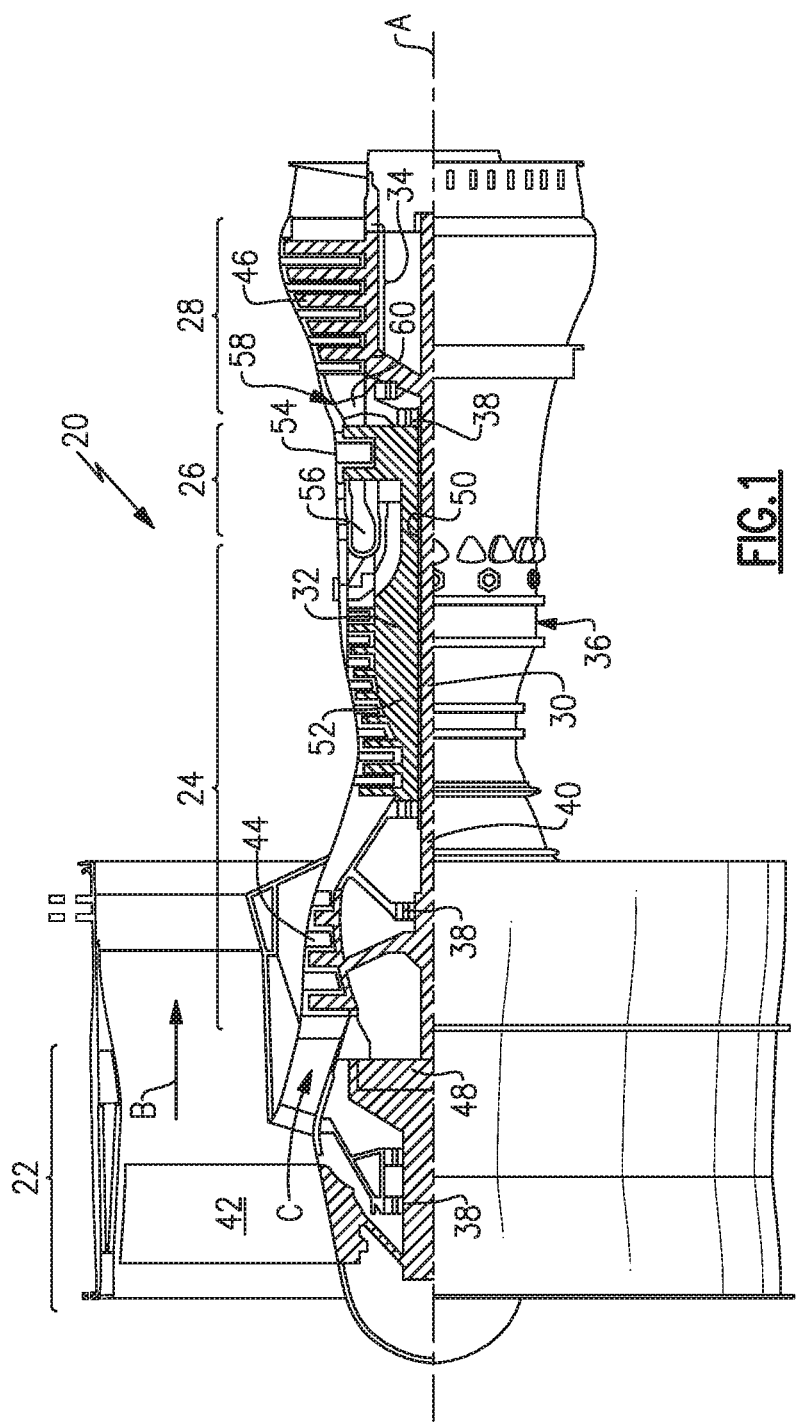
FIG. 1 shows a section view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a gas turbine gas turbine engine, it should be understood that the concepts described herein are not limited to use with gas turbines as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as bucket cruise Thrust Specific Fuel Consumption (TSFC)—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades in the fan section 22 disclose an example gas turbine engine 20 with increased power transfer efficiency.

Referring to FIGS. 2 and 3, in one embodiment, the engine 20 is supported by a support structure 62 often generically referred to as an upper bifurcation 62U and a lower bifurcation 62L. Other types of support structures at various circumferential locations may be used instead of, or in addition to, the support structure 62.

The structure 62 extends radially from an outer wall 64 of an engine casing 66 to an inner wall 68 of a nacelle 70. The structure 62, engine casing 66, and the nacelle 70 provide a nacelle assembly.

The engine casing 66 covers a core of the engine 20. A portion of the engine 20 is received within the nacelle 70. The bypass flowpath B is radially bounded by the outer wall 64 and the inner wall 68. The flow moving along the bypass flowpath B communicates through the generally annular (circumferentially broken by the support structure 62) bypass flow path B and is discharged through a nozzle 74. The support structure 62, occupies some portion of the volume between the engine casing 66 and the nacelle 70. For example, each bifurcation 62U or 62L of the support structure 62 may occupy from 20 to 40 degrees of the 360 degrees of the bypass flow path B.

A plurality of radially extending fan exit guide vanes 76 are upstream from the support structure 62. The fan exit guide vanes 76 extend radially from the outer wall 64 of the engine casing 66 to the inner wall 68 of the nacelle 70. The fan exit guide vanes 76 influence flow from the fan 42 to efficiently move flow along the bypass flow path B. In some examples, the fan exit guide vanes 76 may straighten the flow from the fan 42. Several fan exit guide vanes 76 are distributed circumferentially about the axis A. The fan exit guide vanes 76 that are circumferentially aligned with the bifurcations 62U and 62L can be configured to steer some flow around the bifurcations 62U and 62L and minimize disturbances to flow moving along the bypass flow path B.

In this example, each bifurcation 62U and 62L extends axially from a leading edge 78 to a trailing edge 82. Each bifurcation 62U and 62L extends radially from an inner edge 86 to an outer edge 88. The inner edge 86 interfaces directly with the outer wall 64 of the engine casing 66. The outer edge 88 interfaces directly with the inner wall 68 of the nacelle 70. The outer edge 88 can attach to hinge and latch beams associated with a fixed inner structure of the nacelle 70.

The bifurcations 62U and 62L of the support structure 62 have an aerodynamic cross-section to further reduce disturbances to flow through the bypass flowpath B. In some examples, one or both of these cross-sections have an "eagle beak" configuration. The eagle beak configuration typically means that opposing sides of the bifurcations 62U and 62L meet at an interface that is offset from the leading edges 78.

One or both of the leading edges 78 of the example bifurcations 62U and 62L are swept. The leading edge 78, when swept, has an angle S relative to a radial axis R. That is, the leading edge 78, when swept, has an angle relative to the axis A that is not 90 degrees.

The leading edge 78 of the bifurcation 62U may have an angle S of sweep that is similar to an angle S of sweep of the leading edge 78 of the bifurcation 62L. In another example, the angle S of sweep of the bifurcation 62U is different than the angle S of sweep of the leading edge 78 of the bifurcation 62L. In still other examples, the leading edge 78 of one of the bifurcations 62U or 62L is swept and the leading edge of the other bifurcation 62U or 62L is not swept.

The angle S of sweep of the leading edge 78 can also vary along the leading edge 78. For example, at a first radially inner position, the angle S of sweep may be 10 degrees, and at a second radially outer position, the angle S of sweep may be 20 degrees. In other examples, only a portion of the leading edge 78 has the angle S of sweep.

The trailing edges 82 of the bifurcation 62U or 62L maybe similarly swept such that the leading edge 78 and its corresponding trailing edge 82 are parallel. The corresponding trailing edge 82 may be swept differently than the leading edge 78 in other examples. In still other examples, the corresponding trailing edge 82 may have no sweep. In such examples, the trailing edge 82 is aligned 90 degrees to the axis A.

In this example, sweeping the leading edge 78 results in the interface between the inner edge 86 and the outer wall 64 of the engine casing 66 extending axially further upstream than the interface between the outer edge 88 and the inner wall 68 of the nacelle 70. Sweeping the leading edge 78 provides more open area O between the fan exit guide vanes 76 and the support structure 62. The example sweep shown is a forward sweep. The sweep, in another example, could be a rearward sweep.

The amount that the leading edge 78 is swept may vary. In some examples, the angle S of sweep is equal or greater than 1 degree offset from the radial axis R. In some, more specific, examples, the sweep is from 2 degrees to 45 degrees offset from the radial axis R. In other, even more specific, examples, the sweep is from 10 degrees to 20 degrees.

Features of the disclosed examples include a support structure having a swept leading edge. The sweep provides more open area between fan exit guide vanes and the support structure giving flow more room to move and straighten prior to being influenced by the support structure. This additional area is especially relevant in engines having a relatively reduced overall axial length.

Although an example embodiment has been disclosed, a worker of ordinary skill in this art would recognize that certain modifications would come within the scope of this disclosure. For that reason, the following claims should be studied to determine the scope and content of this disclosure.

I claim:

1. A gas turbine engine comprising:
    a fan, a compressor section, a combustor section, and a turbine section, wherein the turbine section drives a shaft to rotatably drive the fan;
    a geared architecture rotatably coupling the shaft and the fan;
    a nacelle having an inner wall providing a bypass duct that receives bypass air from the fan, the inner wall surrounding the fan, a support structure extending radially from a core of the gas turbine engine to the inner wan, the support structure having at least one leading edge that is forward swept, and the support structure being downstream of a plurality of guide vanes in the bypass duct, wherein the at least one leading edge has an angle relative to a radial axis of the gas turbine engine, and the angle is from 10 degrees to 20 degrees; and wherein a number of fan blades in the fan are less than 20
the compressor section includes a low pressure compressor and a high pressure compressor, the turbine section includes a low pressure turbine and a high pressure turbine, wherein the low pressure turbine drives the shaft and the low pressure compressor in operation, the high pressure turbine drives the high pressure compressor, wherein a number of turbine rotors in the low pressure turbine are at least 3 but no more than 6, and
a ratio between the number of the fan blades and the number of the turbine rotors is between 3.3 and 8.6.

2. The gas turbine engine of claim 1, wherein the at least one leading edge extends radially from the core to the inner wall, and the support structure comprises an upper bifurcation and a lower bifurcation each defining a respective one of the at least one leading edge.

3. The gas turbine engine of claim 2, wherein the angle corresponding to each of the upper bifurcation and the lower bifurcation is less than 45 degrees.

4. The gas turbine engine of claim 3, wherein the angle corresponding to each of the upper bifurcation and the lower bifurcation being greater than 1 degree.

5. The gas turbine engine of claim 4, wherein each guide vane of the plurality of guide vanes is swept.

6. The gas turbine engine of claim 5, wherein the angle corresponding to each of the upper bifurcation and the lower bifurcation is from 10 degrees to 20 degrees.

7. The gas turbine engine of claim 6, wherein the angle of the at least one leading edge corresponding to the upper bifurcation being different from the angle of the at least one leading edge corresponding to the lower bifurcation.

8. The gas turbine engine of claim 7, wherein the bypass duct defines a bypass flow path, and each of the upper bifurcation and the lower bifurcation occupies between 20 to 40 degrees of the bypass flow path.

9. The gas turbine engine of claim 8, wherein at least one guide vane of the plurality of guide vanes is circumferentially aligned with the support structure.

10. The gas turbine engine of claim 5, wherein the geared architecture is an epicyclical gear train.

11. The gas turbine engine of claim 10, further comprising a fan pressure ratio of less than 1.45 across the fan blades alone at cruise.

12. The gas turbine engine of claim 11, wherein each of the upper bifurcation and the lower bifurcation extends axially from the respective, one of the at least one leading edge to a trailing edge that is parallel to the respective, the one of the at least one leading edge.

* * * * *

UNITED STATES PATENT AND TRADEMARK OFFICE
CERTIFICATE OF CORRECTION

| | | |
|---|---|---|
| PATENT NO. | : 10,808,621 B2 | Page 1 of 1 |
| APPLICATION NO. | : 15/784463 | |
| DATED | : October 20, 2020 | |
| INVENTOR(S) | : Brent Veiga | |

It is certified that error appears in the above-identified patent and that said Letters Patent is hereby corrected as shown below:

In the Claims

In Claim 1, Column 6, Line 61; replace "the inner wan" with --the inner wall--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*